(12) United States Patent
Chen

(10) Patent No.: US 10,340,099 B2
(45) Date of Patent: Jul. 2, 2019

(54) MOUSE WITH REMOVABLE BUTTON SWITCH

(71) Applicant: Dexin Corporation, New Taipei (TW)

(72) Inventor: Yi-Shun Chen, New Taipei (TW)

(73) Assignee: Dexin Corporation, New Taipei (TW)

( * ) Notice: Subject to any disclaimer, the term of this patent is extended or adjusted under 35 U.S.C. 154(b) by 11 days.

(21) Appl. No.: 15/685,036

(22) Filed: Aug. 24, 2017

(65) Prior Publication Data

US 2018/0240620 A1   Aug. 23, 2018

(30) Foreign Application Priority Data

Feb. 20, 2017 (TW) .............................. 106105577 A

(51) Int. Cl.
  *H01H 13/14* (2006.01)
  *G06F 3/0354* (2013.01)

(52) U.S. Cl.
  CPC ......... *H01H 13/14* (2013.01); *G06F 3/03543* (2013.01); *H01H 2231/002* (2013.01)

(58) Field of Classification Search
  CPC .... G06F 3/03543; G06F 3/0219; H01H 13/14
  See application file for complete search history.

(56) References Cited

U.S. PATENT DOCUMENTS

| 4,410,222 A | * | 10/1983 | Enomoto | H01R 12/79 439/157 |
| 2002/0060666 A1 | * | 5/2002 | Close | G06F 3/03543 345/163 |
| 2006/0176277 A1 | * | 8/2006 | Daniel | G06F 3/0317 345/163 |
| 2010/0231514 A1 | * | 9/2010 | Min-Liang | G06F 3/03543 345/163 |

* cited by examiner

*Primary Examiner* — Dong Hui Liang
(74) *Attorney, Agent, or Firm* — Woodard, Emhardt, Henry, Reeves & Wagner, LLP

(57) ABSTRACT

A mouse with a removable button switch includes: a release unit, including a bearer mounted on a circuit board of the mouse; a press-fixing and ejection means provided with a press-fixing part and an ejection part; and a press-fixing means, the press-fixing means and the press-fixing and ejection means being oppositely disposed on both sides of the bearer, and the press-fixing means being provided with the press-fixing part. In the mouse with the removable button switch in the present invention, because the button switch is not fixed on the circuit board of the mouse in a welding manner, when the button switch is faulty or a different hand feeling is required, the button switch can be conveniently replaced without causing damage to the mouse.

2 Claims, 2 Drawing Sheets

MOUSE WITH REMOVABLE BUTTON SWITCH

TECHNICAL FIELD

The present invention relates to peripheral devices of computers, and in particular, to a mouse with a removable button switch.

BACKGROUND

With the continuous development of science and technology, computer devices, such as personal computers, notebook computers, and tablet computers, and even portable mobile apparatuses of various sizes become indispensable convenient tools for daily life, entertainment, or work of people. However, mouses are commonly used devices of the foregoing devices or apparatuses.

For a conventional mouse, a pin of a button switch is welded on a circuit board of the mouse. In addition, there are different designs for the gram weight, service life, and handing feeling of button switches in mouses, and each type of mouse has advantages and disadvantages. If a button switch needs to be replaced because a button switch is faulty or a user wants to try a different hand feeling, a tool needs to be used for dewelding; it is difficult to replace the button switch, and the mouse is even damaged.

SUMMARY

In view of the foregoing problems, a purpose of the present invention is to provide a mouse with a removable button switch. Because the button switch is not fixed to a circuit board of the mouse in a welding manner, when the button switch is faulty or a different hand feeling is required, the button switch may be easily replaced, and no damage is caused to the mouse.

One aspect of the present invention provides a mouse with a removable button switch, including:
 a release unit, including:
 a bearer, mounted on a circuit board of the mouse;
 a press-fixing and ejection means, provided with a press-fixing part and an ejection part; and
 a press-fixing means, the press-fixing means and the press-fixing and ejection means being oppositely disposed on both sides of the bearer, and the press-fixing means being provided with the press-fixing part.

According to the aspect of the present invention, an electrical connection part of the bearer is electrically connected to the circuit board and the button switch.

According to the aspect of the present invention, the button switch is disposed between the press-fixing means and the press-fixing and ejection means, the button switch is fixed in the bearer by the press-fixing part of the press-fixing means and the press-fixing part of the press-fixing and ejection means, and the button switch in the bearer is ejected by the ejection part of the press-fixing and ejection means.

DETAILED DESCRIPTION

For the purposes of promoting an understanding of the principles of the invention, the mouse with a removable button switch of the present invention is described below, and in applicants' Taiwanese priority application No. 106105577, filed Feb. 20, 2017, the entire contents of which are hereby incorporated herein by reference. The written description and drawings are intended to illustrate the invention in a fashion that allows those who are engaged in the relevant areas to understand and appreciate the invention and several of its preferred embodiments conceptually. It will nevertheless be understood that no limitation of the scope of the invention is thereby intended, with such alterations and modifications to the illustrated device being contemplated as would normally occur to one skilled in the art to which the invention relates.

Figure 1:
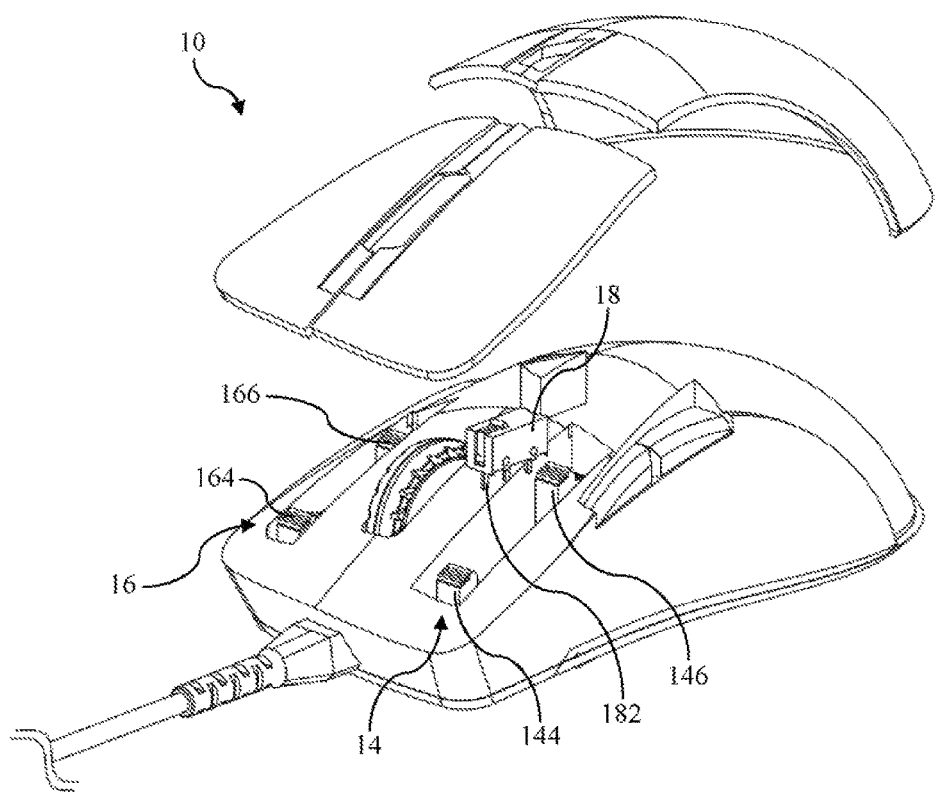
FIG. 1 is a schematic exploded view of a part of a mouse with a removable button switch according to the present invention.
Figure 2:
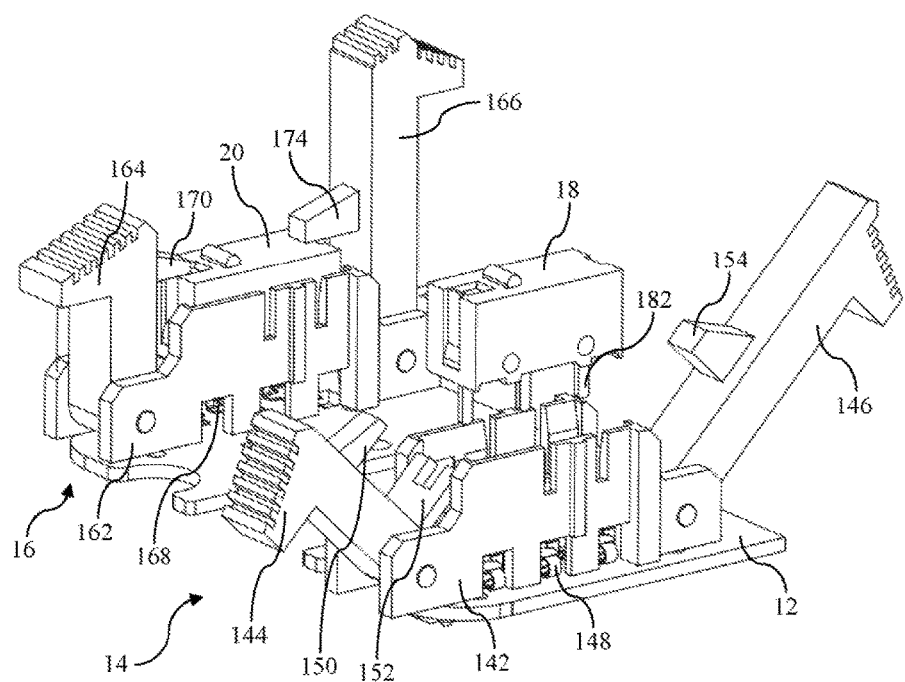
FIG. 2 is a schematic diagram of a release unit according to the present invention.

FIG. 1 is a schematic exploded view of a part of a mouse with a removable button switch according to the present invention, and FIG. 2 is a schematic diagram of a release unit according to the present invention.

In FIG. 1 and FIG. 2, a mouse 10 includes a circuit board 12, release units 14 and 16, and button switches 18 and 20. The mouse 10 further includes components such as a scroll wheel, a controller, a switch, a track detector, and a battery, and the components are known by a person skilled in the art. Details are not described herein again.

The release units 14 and 16 are mounted on the circuit board 12. The release unit 14 includes a bearer 142, a press-fixing and ejection means 144, and a press-fixing means 146. The release unit 16 includes a bearer 162, a press-fixing and ejection means 164, and a press-fixing means 166.

The bearers 142 and 162 are mounted on the circuit board 12. Electrical connection parts 148 and 168 of the bearers 142 and 162 are electrically connected to the circuit board 12, where the electrical connection parts 148 and 168 are, for example, elastomers, spring plates, or bolts that are made of metal. The press-fixing and ejection means 144 and the press-fixing means 146 are oppositely disposed on both sides of the bearer 142, and the press-fixing and ejection means 164 and the press-fixing means 166 are oppositely disposed on both sides of the bearer 162.

The press-fixing and ejection means 144 is provided with a press-fixing part 150 and an ejection part 152. The press-fixing means 146 is provided with a press-fixing part 154. The press-fixing and ejection means 164 is provided with a press-fixing part 170 and an ejection part (not shown). The press-fixing means 166 is provided with a press-fixing part 174.

The button switch 18 is disposed between the press-fixing means 146 and the press-fixing and ejection means 144, and the button switch 20 is disposed between the press-fixing means 166 and the press-fixing and ejection means 164. If the press-fixing means 146 and the press-fixing and ejection means 144 approach each other, the press-fixing part 154 of the press-fixing means 146 and the press-fixing part 150 of the press-fixing and ejection means 144 press and fix the button switch 18 in the bearer 142. When the button switch 18 is pressed and fixed in the bearer 142 by the press-fixing means 146 and the press-fixing and ejection means 144, a pin 182 of the button switch 18 is electrically connected to the electrical connection part 148 of the bearer 142. If the press-fixing means 166 and the press-fixing and ejection means 164 approach each other, the press-fixing part 174 of the press-fixing means 166 and the press-fixing part 170 of the press-fixing and ejection means 164 press and fix the button switch 20 in the bearer 162. When the button switch 20 is pressed and fixed in the bearer 162 by the press-fixing means 166 and the press-fixing and ejection means 164, a pin (not shown) of the button switch 20 is electrically connected to the electrical connection part 168 of the bearer 162.

If the press-fixing means 146 and the press-fixing and ejection means 144 move away from each other, the button switch 18 in the bearer 142 is ejected by the ejection part 152 of the press-fixing and ejection means 144. In this case, the pin 182 of the button switch 18 is disconnected from the electrical connection part 148 of the bearer 142. If the press-fixing means 166 and the press-fixing and ejection means 164 move away from each other, the button switch 20 in the bearer 162 is ejected by the ejection part of the press-fixing and ejection means 164. In this case, the pin of the button switch 20 is disconnected from the electrical connection part 168 of the bearer 162.

The button switch 18 is pressed and fixed in the bearer 142 or is ejected from the bearer 142 by using the press-fixing part 150 and the ejection part 152 of the press-fixing and ejection means 144, and the press-fixing part 154 of the press-fixing means 146, and the button switch 20 is pressed and fixed in the bearer 162 or is ejected from the bearer 162 by using the press-fixing part 170 and the ejection part of the press-fixing and ejection means 164, and the press-fixing part 174 of the press-fixing means 166, so that the button switches can be replaced very easily without using a tool.

The present invention provides a mouse with a removable button switch. An advantage of the mouse is that the button switch is not fixed on a circuit board of the mouse in a welding manner, and when the button switch is faulty or a different hand feeling is required, the button switch can be conveniently replaced without causing damage to the mouse.

In the context of this written description, the following terms and reference numerals have been used:

Mouse 10
Circuit board 12
Release unit 14
Release unit 16
Button switch 18
Button switch 20
Bearer 142
Press-fixing and ejection means 144
Press-fixing means 146
Electrical connection part 148
Press-fixing part 150
Ejection part 152
Press-fixing part 154
Bearer 162
Press-fixing and ejection means 164
Press-fixing means 166
Electrical connection part 168
Press-fixing part 170
Press-fixing part 174
Pin 182

While the invention has been illustrated and described in detail in the drawings and foregoing description, the same is to be considered as illustrative and not restrictive in character, it being understood that only certain preferred embodiments have been shown and described, and that all changes and modifications that come within the spirit of the invention are desired to be protected.

Additionally, it is to be appreciated that the present invention may comprise or consist essentially of any or all of the described or illustrated elements. Further, any or all of the features, elements, and/or embodiments disclosed herein may be combined with any or all of the other features, elements, and/or embodiments disclosed herein to provide an invention that comprises or consists essentially of such features, elements, and/or embodiments.

The invention claimed is:

1. A mouse with a removable button switch, comprising:
   a release unit, comprising a bearer, mounted on a circuit board of the mouse;
   a press-fixing and ejection means, provided with a press-fixing part and an ejection part; and
   a press-fixing means, the press-fixing means and the press-fixing and ejection means being oppositely disposed on both sides of the bearer, and the press-fixing means being provided with the press-fixing part;
   wherein the button switch is disposed between the press-fixing means and the press-fixing and ejection means, the button switch is fixed in the bearer by the press-fixing part of the press-fixing means and the press-fixing part of the press-fixing and ejection means, and the button switch in the bearer is ejected by the ejection part of the press-fixing and ejection means.

2. The mouse according to claim 1, wherein an electrical connection part of the bearer is electrically connected to the circuit board and the button switch.

\* \* \* \* \*